Jan. 16, 1951 J. F. BARRY 2,538,496

METALLIC CONTAINER SEALING APPARATUS

Original Filed Jan. 4, 1947

INVENTOR
J. F. BARRY
BY
[signature]
ATTORNEY

Patented Jan. 16, 1951 2,538,496

UNITED STATES PATENT OFFICE 2,538,496

METALLIC CONTAINER SEALING APPARATUS

Joseph F. Barry, Summit, N. J., assignor to Bell Telephone Laboratories, Incorporated, New York, N. Y., a corporation of New York Original application January 4, 1947, Serial No. 720,263. Divided and this application December 22, 1948, Serial No. 66,790

4 Claims. (Cl. 219—4)

This invention relates to methods and apparatus for sealing metallic receptacles and more particularly to such receptacles employed as containers for pressure sensitive electrical elements, such as piezoelectric crystal wafers or blanks used in communication systems.

This application is a division of my application Serial No. 720,263, filed January 4, 1947.

The crystal blank is usually enclosed in a protective casing which is either highly evacuated or filled with dry air under controlled pressure so that the frequency range of the crystal blank may be held stable. When the casing is formed substantially wholly of metal, the crystal blank is mounted on two terminals insulatingly sealed in a base portion and the crystal is enclosed in a cover portion which is soldered or brazed to the base portion.

The soldering or brazing operation is generally performed in a furnace or oven in which the temperatures and time of fusion of the solder seal impose deleterious effects on the frequency characteristics of the crystal blank. The heat radiation encountered within the casing during the heat treatment to effect the seal is such that contamination may occur in the crystal blank or on the surface thereof which seriously affects the frequency characteristics and renders the crystal unstable in the frequency range for which it is intended.

An object of this invention is to produce the final sealing of the casing in a controlled atmosphere so that contamination of the crystal blank is avoided.

Another object of the invention is to manually control the sealing of the casing externally of the low pressure housing in which the crystal units are mounted for final processing.

A further object of the invention is to facilitate the manufacturing processes of crystal production at low cost and low shrinkage loss.

Another object of the invention is to expedite the mass production of crystal units by multiple sealing methods in which a group of units are processed in succession in a single operation.

These objects are attained in accordance with the features of this invention by the final sealing of the casing unit in a preliminary low vacuum environment to remove moisture and atmospheric contaminants which are replaced by a controlled low humidity atmosphere of suitable pressure prior to sealing the casing unit. This is accomplished in one way by mounting the unit in a bell jar, which may be evacuated to any desired degree, and supplying dry air to the jar for immersing the crystal blank in a controlled and predetermined environment whereby injurious gases or vapors are entirely eliminated and the frequency characteristics of the crystal remain constant throughout the operating life of the unit.

The bell jar assembly is also provided with mounting means for the unit casing and an adjustable movable carbon pencil electrode for sealing the pin hole opening of the casing through which the unit is evacuated and filled with the controlled pressure of dry air.

A feature of this assembly is the sealing of the movable joint of the carbon or resistive pencil structure whereby the sealing of the crystal unit may be controlled at a point outside of the bell jar by the operator. The carbon pencil is supported on a standard which may be rotatably and reciprocally moved to manipulate the pencil with respect to a plurality of units under process in the controlled atmosphere of the sealed bell jar. The standard extends through a tubular joint in the base of the jar and is coupled to a knob which is controlled by the operator. The standard is sealed from entrance of air through the joints by a resilient or yieldable sleeve rigidly clamped to the tubular joint and the knob extension on the standard. After the desired vacuum is attained in the bell jar or if a definite pressure of dry air is supplied to the enclosure including the unit casing, a solder coated insert placed over the pin hole opening in the side of the cover of the casing is contacted by the carbon pencil and heating current fuses the solder coating on the insert to seal the pin hole in the casing. This arrangement permits the seal to be effected in a controlled atmosphere so that injurious matter is eliminated from the sealed unit and thereby the constancy of the frequency characteristics may be preserved. Furthermore, this method materially reduces the number of rejects in quantity production of crystal units so that the manufacturing costs are reduced.

Another feature of this invention relates to the mounting of a plurality of crystal units in a multiple fixture within the bell jar so that the sealing of a group of units may be accomplished in a single cycle operation. This is accomplished by mounting a number of crystal units in arcuate relation in a holding fixture which is located within the radius of the movable carbon pencil in the bell jar so that the pin hole sealing operation may be performed in succession with each cycle of operation of the sealing method.

These and other features of the invention will be more clearly understood from the following detailed description when considered with reference to the accompanying drawings, wherein.

Figures 1, 4:
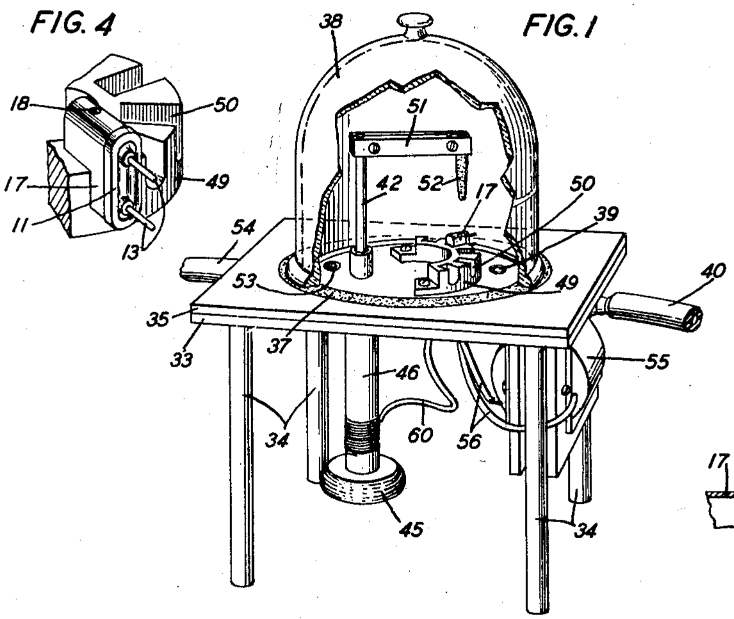
Fig. 1 illustrates, in a perspective view, the final sealing apparatus with a portion of the bell jar broken away to show the internal structure.
Fig. 4 illustrates, in enlarged perspective view, the holder for the crystal units employed in the assembly of Fig. 1.

The invention is shown, in a particular aspect, as applicable to a piezoelectric quartz crystal blank enclosed in an hermetically sealed metallic casing having an elongated base portion 11 supporting a pair of terminal prongs 13 and a metallic cover portion 17 which is sealed in a vacuum-tight manner in accordance with the disclosure of the above-mentioned application. A more detailed description of the complete structure of the crystal unit is also contained in said application. The cover portion of the casing is provided with a recess 18 in the side wall having an aperture or pin hole 19 which is sealed by a metallic insert disc soldered over the pin hole to complete the assembly of the unit.

Figure 2:
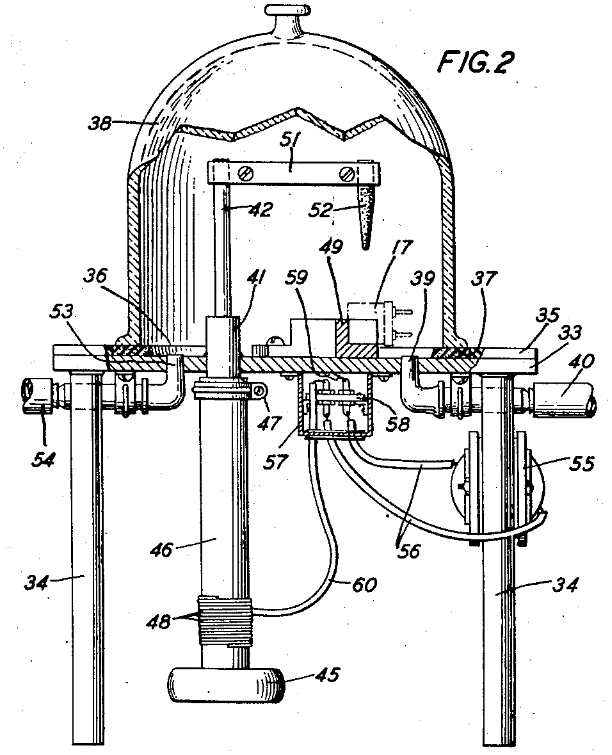
Fig. 2 is an elevational view, partly in cross-section, showing the details of the assembly for the final sealing of the crystal units.
Figure 3:
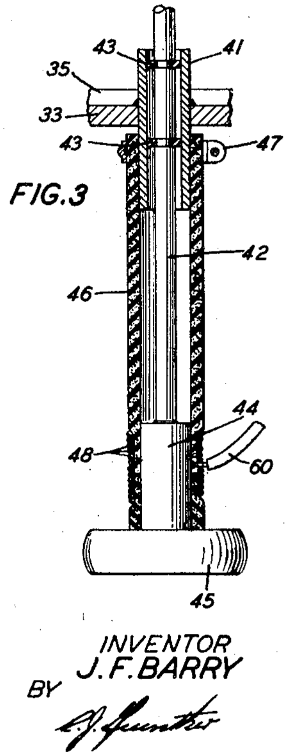
Fig. 3 is an enlarged detailed view, in cross-section, of the sealed joints of the movable standard extending into the bell jar.

Referring to Figs. 1 and 2 of the drawing, the final sealing of the crystal unit is produced in the apparatus shown therein in which a bell jar is utilized during the sealing operation. The sealing assembly has a rectangular metallic base or plate 33 which is mounted in elevated position by four legs 34 secured at the corners thereof to form a table structure which may be mounted on a bench for convenient operation of the various controls utilized in performing the sealing operation in the enclosed chamber. The base is provided with an insulating layer 35 of thick sheet material having a large central cut-out portion 36 and an annular ring 37, for example, of pliable rubber material, which is seated within the cut-out portion of the layer 35 and rigidly attached to the metallic base and the inner edge of the layer 35. The ring 37 forms a contact seal with the ground edge of a glass bell jar 38, which forms an enclosing chamber for performing the sealing operation, in accordance with this invention. A nozzle 39 extending below the table enters an opening leading into the chamber and is soldered or welded to the plate 33 with a coupling connection clamped to the table and a supply hose 40 connected to the coupling for evacuating the chamber enclosed by the bell jar. A metallic tubular member 41 extends through the plate 33 and is rigidly fixed in position by soldering the mid-portion to the plate, the tubular member being offset with respect to the axis of the chamber. A movable shaft or standard 42, for example a metallic rod, extends through the tubular member and is supported therein by a pair of spaced insulating bushings 43 which engage the inner wall of the tubular member, as shown in Fig. 3. The shaft 42 is provided with an enlarged head 44 at the outer end and a hand knob 45, of insulating material, is rigidly affixed to the head 44. A resilient sleeve member 46, preferably of rubber tubing, extends between the tubular member 41 and the head 44 to form a flexible coupling joint between the tubular member 41 and the standard assembly, the rubber sleeve being sealed to the tubular member and rigidly affixed thereto by a clamp 47. The sleeve is also sealed to the head 44 by a suitable adhesive and rigidly held thereon by a wire binding 48.

A metallic holding fixture 49, shown more clearly in Fig. 4, having an arcuate form and provided with a plurality of slots 50 which conform to the shape of the crystal units, is rigidly affixed to the metallic plate 33 by screws, in spaced relation to the tubular member 41 and the shaft 42. The arcuate fixture is merely shown as an example of mounting for a plurality of crystal units in the chamber for multiple sealing of the units during one operation. It is, of course, understood that the invention is not limited to this fixture since the mounting may be formed of a complete circle with the movable shaft in a central position at the axis of the chamber.

The offset shaft 42 is provided with a pair of metallic arms 51 which extend in parallel relation transversely to the shaft at the inner end thereof, the arms being attached at one end to the shaft by a screw and supporting a removable carbon pencil 52 at the opposite end. The pencil is suspended from the arms and directed towards the crystal units in the mounting jig 49 so that rotatable movements of the shaft 42 will permit the travel of the carbon pencil in an arc coinciding with the positions of the pin hole openings 19 in the crystal units mounted in the fixture. A short tube 53 extends through the plate 33 to form another inlet into the chamber opposite the vacuum inlet 39, the tube being attached exterior to the chamber to an air supply line or hose 54.

A transformer 55 is mounted below the base plate 33 for supplying welding current to the sealing fixture, the output of the transformer being connected to a pair of conductors 56 which extend into a conduit box 57 attached to the lower side of the base. The conductors are connected to a pair of terminals on a connector block 58 mounted within the conduit box. A short conductor 59 extends from one of the terminals to the undersurface of the base 33 and is welded thereto for supplying welding current to the mounting fixture 49. A conductor 60 connected to the other terminal extends from the box and is soldered to the head 44 on the movable shaft, as shown more clearly in Fig. 3, to supply welding current to the movable shaft and finally to the carbon pencil electrode 52 which is brought into contact with the crystal unit by manipulation of the movable shaft, to seal the pin hole opening in the crystal unit.

Figure 5:
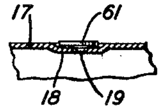
Fig. 5 is a fragmentary view, in cross-section, to an enlarged scale, of details of the pin hole seal in the side of the crystal casing.

In the final sealing process of the crystal unit a plurality of units are mounted in the fixture 49, with the pin hole openings 19 uppermost in the mounting, and positioned in the slots 50 so that the terminal prongs 13 extend outwardly from the mounting. In this position the pin hole opening is aligned with the arcuate movement of the carbon pencil electrode 52 within the chamber. A tinned closure 61, preferably in the form of a disc, as shown in Fig. 5, is placed in the recess of each unit in the mounting fixture, the tinned surface of the disc making rough contact with the recess so that air may be removed from the interior of the unit by the pumping system. When the mounting fixture is loaded with the tinned discs 61 placed in the recesses of the units, as shown in Fig. 4, the bell jar 38 is placed on the ring 37 and the pumping system started to evacuate the chamber through the nozzle 39 to a low pressure of one to three inches of mercury absolute, and when all the air and moisture are removed from the crystal casing and the chamber, the final seal may be made if it is desired to maintain the crystal blank in a low pressure environment. The sealing is performed by manipulating the shaft 42 by the external hand knob 45 to bring the carbon pencil in line with the disc 61 of one of the units and lowering the carbon pencil electrode 52 into contact with the disc by pulling the knob 45 downwardly, whereupon the welding circuit is completed through the shaft and pencil and the disc on the casing in the mounting unit which latter forms the stationary electrode for the completion of the welding circuit. The heating current melts the solder coating on the disc and the disc is fused over the pin hole opening 19 in the casing to permanently seal the unit.

If it is desired to maintain the crystal blank in a gaseous environment at higher pressure, this may be performed by following the same procedure of evacuation and then supplying dry air to the chamber through opening 53, the air supply being previously processed so that it does not exceed 18 per cent relative humidity at 25° C. to prevent the entrance of moisture into the sealed casing of the unit. The preferred practice in order to remove moisture and contaminating gases from the casing is to evacuate the chamber to a vacuum pressure of one to three inches of mercury absolute and then inject the dry air into the chamber, these operations being performed alternately several times to insure a relatively moisture-free environment in the sealed casing. When this procedure is completed the disc 61 is sealed by contact of the carbon pencil to close the opening 19 in each of the crystal units.

The final sealing assembly of this invention provides a controlled atmosphere for the sealing of the crystal unit wherein the sealing is performed manually by the operation of the movable electrode within the chamber and the construction of the movable electrode assembly permits the maintenance of a desired pressure in the chamber without contaminating air leaking into the chamber. This is produced by the yieldable and flexible sleeve on the standard assembly which permits reciprocal and rotatable movement of the electrode within the chamber by external manipulation so that the unit, after evacuation and filling, may be sealed while in the purified environment of the chamber and contamination of the filling is prevented.

It is, of course, understood that various modifications may be made in the detailed assembly of the structures and methods herein described without departing from the scope and spirit of the invention as defined in the appended claims.

What is claimed is:

1. In sealing apparatus comprising a chamber having a base portion, a tubular member extending into said base portion, an exhaust connection leading into said chamber, and a mounting fixture attached to said base portion adapted to support a casing having an aperture therein to be sealed and an insert covering said aperture sealing means comprising a movable standard extending through said tubular member, a pencil electrode carried by said standard, an expansible and impervious sleeve affixed to said tubular member and standard for reciprocal and rotatable movement of said electrode within said chamber, and conductors connected to said fixture and standard for supplying heating energy for sealing said aperture in said casing by the bonding to said casing about said aperture of said insert covering said aperture.

2. In sealing apparatus comprising a chamber having a base portion, a tubular member extending into said base portion, an exhaust connection leading into said chamber, means for supplying dry air to said chamber, and a mounting block on said base portion adapted to support a plurality of metallic units therein, each of said units having a pin hole opening covered by a loosely applied tinned disc, sealing means comprising a metallic standard extending through said tubular member, slidable means insulating said standard from said member, an arm projecting from the inner end of said standard, a resistive pencil electrode on said arm directed toward said units in said block, a yieldable sleeve rigidly connected to said tubular member and standard for forming a flexible hermetic seal therebetween, a conductor attached to said block, and another conductor attached to said standard exterior to said chamber.

3. In sealing apparatus for an hermetic casing of a crystal unit, comprising a base plate, a bell jar forming a sealed joint with said base plate and providing a chamber of controlled sealing conditions, a tube joined to said base and extending within said chamber, means for evacuating said chamber to a low pressure, and a mounting fixture located on said base for supporting the casing of a crystal unit, said casing having a pin hole opening therein and tinned closure superimposed over said opening, sealing means, comprising a reciprocally and rotatably movable standard insulatingly supported within said tube and extending into said chamber and outwardly from said tube for manual operation, a yieldable sleeve member extending from the outer end of said tube to said standard and sealed to both to prevent entrance of air into said chamber, a resistive pencil electrode projecting downwardly from said standard for engaging said closure whereby fusion and pressure on the closure seals the pin hole in said unit, and conductors leading to said standard and fixture for supplying heating current to said closure whereby said closure may be fused to said casing sealingly about said opening.

4. In apparatus having a base, a transparent chamber fixed on said base, and means for supporting on edge within said chamber in arcuate array a plurality of piezoelectric crystal units to be sealed, each of said units having therein an aperture overlaid by a tinned insert, the combination of a carbon electrode mounted within said chamber for arcuate and reciprocable movement, means for supplying electrical potential between said electrode and said base, whereby a heating current supply circuit may be completed through one of said crystal units to be sealed, and means disposed externally of said chamber, extending sealingly thereinto and coupled to said electrode for precisely positioning said electrode relative to the insert in any of said units.

JOSEPH F. BARRY.

REFERENCES CITED

The following references are of record in the file of this patent:

UNITED STATES PATENTS

| Number | Name | Date |
|---|---|---|
| 1,237,200 | Gray | Aug. 14, 1917 |
| 1,507,166 | Garrett | Sept. 2, 1924 |
| 2,101,156 | Payne | Dec. 7, 1937 |
| 2,381,764 | McFarland, Jr. | Aug. 7, 1945 |
| 2,435,747 | Larson | Feb. 10, 1948 |
| 2,459,812 | Griffiths | Jan. 25, 1949 |
| 2,479,024 | Pujol y Font | Aug. 16, 1949 |
| 2,481,042 | Tomasek et al. | Sept. 6, 1949 |